United States Patent [19]

Korbuly

[11] Patent Number: 4,641,999
[45] Date of Patent: Feb. 10, 1987

[54] MEANS FOR PROTECTING SUPPORT STRUCTURES OR SIMILAR FROM SHOCKS

[75] Inventor: Gergely Korbuly, Chatou, France

[73] Assignee: Hutchinson Sa, Paris, France

[21] Appl. No.: 664,962

[22] Filed: Oct. 26, 1984

[30] Foreign Application Priority Data

Oct. 28, 1983 [FR] France .............................. 83 17321

[51] Int. Cl.$^4$ .............................................. E02B 3/22
[52] U.S. Cl. .................................... 405/215; 405/212; 114/219; 267/140
[58] Field of Search ................................ 405/211–216; 114/219, 220; 267/139–141; 293/108, 155; 248/219.4, 345.1

[56] References Cited

U.S. PATENT DOCUMENTS

| | | | |
|---|---|---|---|
| 2,027,800 | 1/1936 | Whitlock | 405/215 |
| 2,606,755 | 8/1952 | Samuels | 267/140 |
| 2,879,985 | 3/1959 | Waddell et al. | 405/215 X |
| 2,926,904 | 3/1960 | Erlbacher | 405/215 X |
| 3,359,030 | 12/1967 | Newman | 114/219 X |
| 3,372,552 | 3/1968 | Liddell | 405/215 |
| 3,449,917 | 6/1969 | Roskopf | 405/215 |
| 3,608,882 | 9/1971 | Culp | 405/215 X |
| 3,645,575 | 2/1972 | Slavney | 267/140 X |
| 3,937,170 | 2/1976 | Drewett | 114/219 |
| 3,999,399 | 12/1976 | Maurer | 405/215 |
| 4,189,919 | 4/1980 | Evans et al. | 114/219 |
| 4,227,832 | 10/1980 | Leone et al. | 114/219 X |

FOREIGN PATENT DOCUMENTS

| | | | |
|---|---|---|---|
| 944720 | 5/1956 | Fed. Rep. of Germany | 405/212 |
| 1039948 | 9/1958 | Fed. Rep. of Germany | 405/215 |
| 2252010 | 6/1975 | France | 405/212 |
| 92747 | 11/1959 | Netherlands | 405/215 |
| 2102098 | 1/1983 | United Kingdom | 405/215 |

*Primary Examiner*—Cornelius J. Husar
*Assistant Examiner*—Nancy J. stodola
*Attorney, Agent, or Firm*—Oblon, Fisher, Spivak, McClelland, & Maier

[57] ABSTRACT

A fender for protecting support structures against shocks applied thereto, of an alongside fender type, comprising a rubber piece with appropriate profile adapted for absorbing the shocks and distributing them uniformly over the structure to be protected, which rubber piece is firmly secured by hot galvanization to a rubber frame whose radius is substantially equal to the radius of the structure to be protected, the assembly formed by the piece carried by a frame being fixed to the structure by fixing member integral with the latter, associated possibly with a fixing member integral with the piece and/or with the frame.

7 Claims, 17 Drawing Figures

MEANS FOR PROTECTING SUPPORT STRUCTURES OR SIMILAR FROM SHOCKS

BACKGROUND OF THE INVENTION

1. Field of the Invention

The present invention relates to improvements to means for protecting support structures or similar against shocks applied thereto, the devices for fixing these protecting means to the structures which they are intended to protect, and more particularly the devices for fixing what are usually called "alongside fenders" to offshore installation pylons or to the ground such as platforms, docks, risers, drilling barges, pylons, quays, etc.

2. Description of the Prior Art

The "alongside" fenders meant more particularly for offshore works, known in the prior art, are generally formed by rubber pieces having a Δ, D or M profile, fixed to a plate which is itself bolted to another plate integral with the structure to be protected, more especially when it is a question of a non flat and in particular cylindrical structure, in a sea environment, the metal systems for securing the rubber protecting pieces to the structure to be protected undergoing intensive corrosion, more especially in the "splash zones" so that the securing bolts do not hold very well and must be frequently replaced, which is time-consuming work.

On the other hand, the fitting of such fenders to a tubular structure presents great difficulties because of the curvature of the strucutre to be protected, so that positioning a plate between the structure and the fender is obligatory. However, the forces to which the fenders are subjected are transmitted unequally to the structures to be protected, because of the methods of fixing the plates to said structures, which involves gussets and zones where the structures to be protected are subjected to particularly high stresses, which are prejudicial thereto.

Proposals have also been made for providing the support structures to be protected with inflatable fenders, formed by a cushion fixed to the structure, for example tubular, to be protected by means of a plate or chains or other cable systems. Since the envelope of these cushions is fragile, it must be protected by a shield, which considerably complicates the design and fitting of this type of fender. Moreover, with inflatable cushions, these fenders must be maintained under constant uniform pressure, whence the need for a permanent pressure check.

Fender systems are moreover known having three components which are fixed to the tubular structure to be protected by means of a collar and which comprise one telescopically sliding component, connected directly to the collar and a second component disposed above the first one and fixed to the structure to be protected by means of a welded or clamped plate, these two components being joined together by a vertical tube on which are fitted rings, excentric for example, which absorb the shocks by deformation.

All these protection systems have the common drawback of requiring, for fixing them to the structures to be protected, means which are complex, difficult to put in place and relatively fragile.

SUMMARY OF THE INVENTION

The present invention has then as aim to provide means for protecting support structures or similar against shocks which answer better the requirements of practice than the protection means previously proposed for the same purpose, particularly in fitting and fixing thereof to said structures, particularly tubular, are adapted so that efficient, relatively flexible and robust fixing is obtained while no parts are subjected to corrosion and/or to premature wear and providing uniform distribution of the forces acting on the structure to be protected, i.e. no zones of fragility are created therein.

The present invention provides a means for protecting support structures or similar against shocks of the alongside fender type, comprising rubber pieces having an appropriate profile adapted to absorb the shocks and to uniformly distribute them over the structure to be protected, in which protection means said rubber piece with appropriate profile is secured, by hot galvanization, to a curved frame whose radius is substantially equal to the radius of the structure to be protected and in that said fender is fixed to said structure by fixing means integral with this latter, which maintain the fender laterally in position, preferably in a removable way.

In another advantageous embodiment of said fixing means, such are formed of angle irons fixed to the structure to be protected, by any appropriate means and preferably by welding, at positions such that the fender is introduced therein by sliding the edges of its base which are maintained in said angle irons.

In another advantageous embodiment of said fixing means, such comprise on the one hand angle irons, particularly in the shape of an L, on the structure to be protected at appropriate positions for maintaining the fender laterally in position and, on the other hand, on the edges of the base of the fender another angle iron, in the shape of an I or L, for engagement in the corresponding angle iron carried by said structure, for locking the fender in position on the structure.

According to another advantageous arrangement of this embodiment, the angle irons carried by the fender are secured to the curved frame which carries the fender.

In another advantageous embodiment of said fixing means, such comprise on the one hand a tube portion fixed more especially by welding, to the structure to be protected and on the other hand a half-round bar fixed more particularly by welding to the frame which carries the fender and adapted to be inserted in said tube section for locking the fender in position on the structure.

In an advantageous arrangement of the embodiments of the fixing means formed on the one hand by an element integral with the fender and/or with the frame which support it and, on the other, by an element integral with the structure to be protected, which cooperate together, this latter element being reinforced by an appropriate strengthening piece such as gusset, stiffener, strut or similar element.

In another advantageous embodiment of said fixing means, such comprise lugs integral with the structure to be protected, disposed opposite orifices formed in the curved frame which supports the fender, securing of the assembly being provided by rivets, pins or similar.

In yet another advantageous embodiment of said fixing means, such comprise a plurality of button-holes provided on the edges of the base of the curved frame, the fixing of which to the structure to be protected is provided by headed rivets or similar.

In another advantageous embodiment of said fixing means, such comprise tubes fixed to the frame and tubes fixed to the structure to be protected, which interfit in juxtaposition with respect to each other, securing of the assembly being provided by means of a locking shaft or similar.

In yet anothor advantageous embodiment of said fixing means, such comprise lugs fixed on the one hand to the frame and on the other, oppositely, to the structure to be protected and whose reciprocal locking is provided by a shaft or similar.

Besides the arrangements which have just been mentioned, the invention comprises yet other arrangements which will be clear from the following description.

The present invention relates more particularly to means of the alongside fender type for protecting support structures or similar against shocks, as well as the means for fixing these fenders to said structures, and the assemblies formed by the structures to be protected provided with protection means fixed to said structures by the fixing means in accordance with the preceding arrangements.

BRIEF DESCRIPTION OF THE DRAWINGS

The invention will be better understood from the complement of description which follows which refers to the accompanying drawings in which:

FIG. 1 is a cross sectional view of a tubular structure to be protected provided with an alongside fender in accordance with the invention, fixed to said structure by fixing means also in accordance with the invention, of which

It should of course be understood, however, that these drawings and corresponding descriptive parts are given solely by way of illustration of the subject of the invention of which they form in no wise a limitation.

DESCRIPTION OF THE PREFERRED EMBODIMENTS

The invention will be described specifically in connection with an offshore drilling platform pylon or leg; it will however be readily understood that the invention is not limited to the protection of such pylons and that its applications extend to the protection of all structures sensitive to shocks, likely to be subjected to severe shocks and for which it is necessary to provide efficient protection ensuring uniform distribution of the stresses over the structure to be protected.

Figure 1:
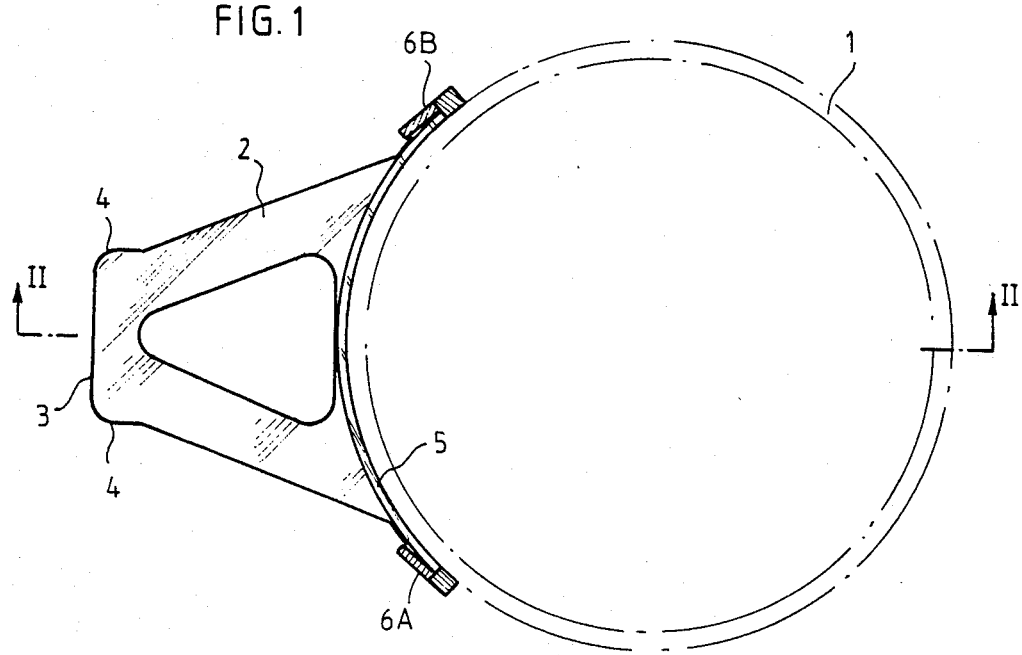
Figure 2:
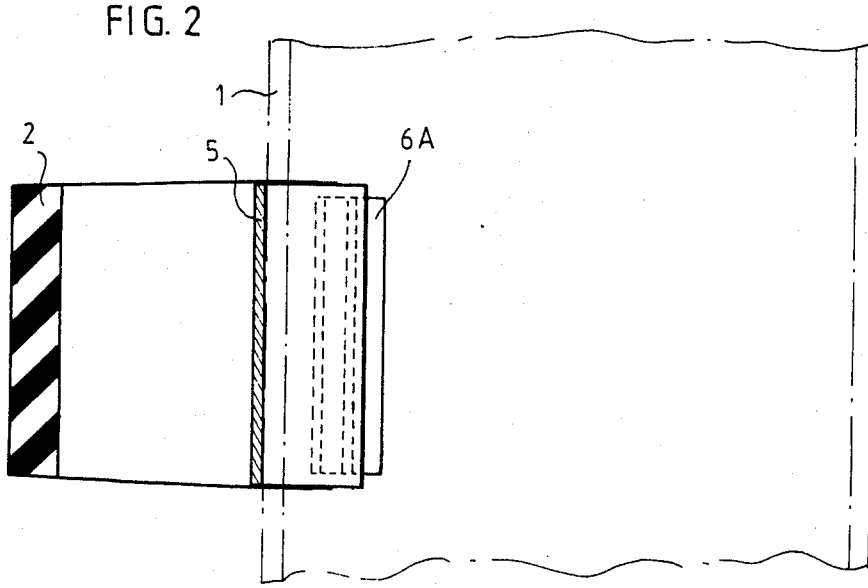
FIG. 2 is a sectional view through II—II of FIG. 1.

In accordance with the invention as shown in FIGS. 1 and 2, the structure to be protected, such as pylon 1 for example is provided with an elastomer "fender" 2 capable of withstanding the most severe deformations, and having a high resistance to stresses, abrasion and corrosion. Fender 2 may have any appropriate known profile and more particularly a Δ, D or M profile. In the case where fender 2 has a Δ profile, it is advantageous for an outer end 3 to comprise lateral swellings or extensions 4 which reinforce it and prevent the formation of a hollow substantially in the axial zone of end 3, when the fender is subjected to a crushing force due to a shock. Fender 2 is fixed to a metal frame 5 by appropriate physico-chemical means and more especially by hot galvanization; frame 5 is curved so that its curve matches the circumferential portion of pylon 1 with which frame 5 is associated, which means that the radius of the frame is the same as the radius of the pylon.

The curve of the frame is chosen as a function of the radius of the tubular structure to be protected, which means that a curved frame of appropriate radius corresponding to the radius of the structure to be protected may be filled according to the needs.

Fixing fender 2 to a curved frame matching the circumferential portion which the fender is to protect, results in uniformly distributing the forces over the structure to be protected; in addition, a fender-frame assembly closely matching the circumferential portion to be protected, because of the curve of the frame and because it comprises no fixing plate, in accordance with the present invention, only opposes a relatively low resistance to the flow of the surrounding water, in the application considered, thus considerably reducing the stresses to which the fender and the structure to be protected are subjected.

Fender 2 is mounted on the pylon 1 to be protected, by means of frame 5, without having to use fixing nuts and bolts which are subject to rapid wear. The means proposed by the present invention for fixing frame 5 to pylon 1 are such that they allow rapid and relatively easy positioning of fender 2 on pylon 1 and removal thereof just as rapidly and easily should the need arise.

According to preferred embodiments of these fixing means, frame 5 carrying fender 2 is fitted to pylon 1 by simple sliding, just as removal thereof.

More specifically, the fixing means shown in FIGS. 1 and 2 are formed by two angle irons 6A and 6B fixed by welding to pylon 1 in correspondance with the two opposite lateral edges of frame 5, in which said lateral edges are introduced by sliding and in which these edges are maintained by wedging or clipping.

Figure 3:
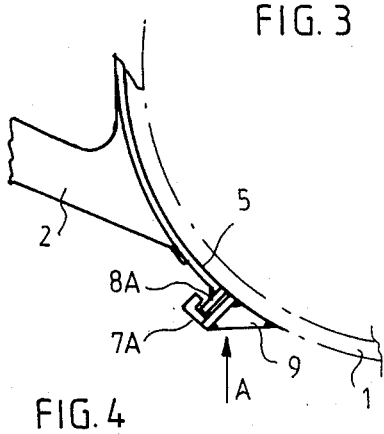
FIG. 3 is a cross sectional view corresponding to that of FIG. 1, showing another embodiment of the fixing means.
Figure 4:
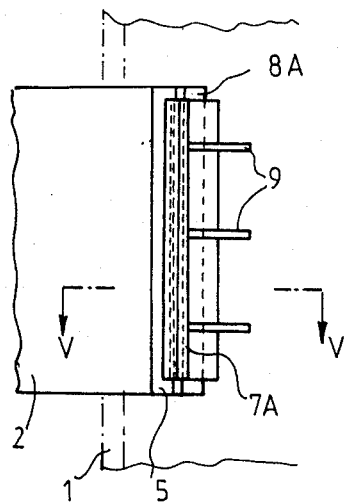
FIG. 4 is a view of the fixing means of FIG. 3, seen in the direction of arrow A of FIG. 3.
Figure 5:
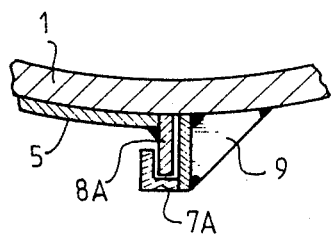
FIG. 5 is a sectional view along V—V of FIG. 4.

According to the embodiment shown in FIGS. 3 to 5, the means for fixing fender 2 to pylon 1 comprise first angle irons 7A,7B welded to pylon 1 and second angle irons 8A,8B welded to the lateral edges of frame 5, which are inserted in angle irons 7A,7B for locking the fender 2 in position on pylon 1; the profile of angle irons 8A,8B may be such as shown in FIG. 5, or be similar to the profile of angle irons 7A,7B. The angle irons 7A,7B are advantageously reinforced by means of gussets 9.

Figure 6:
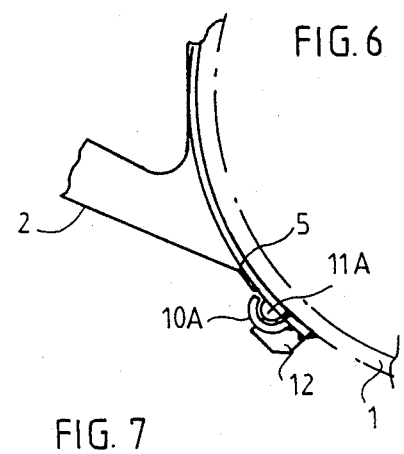
FIGS. 6 to 8 are views similar to FIGS. 3 to 5 of another embodiment of the fixing means.
Figure 7:
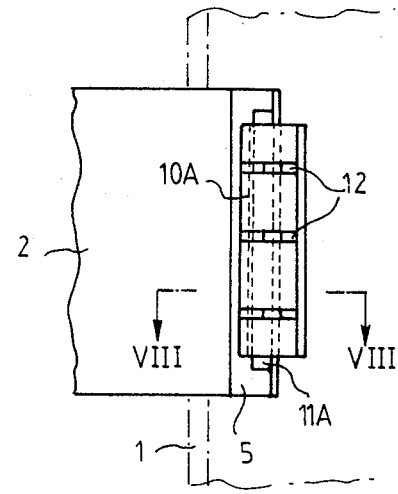
Figure 8:
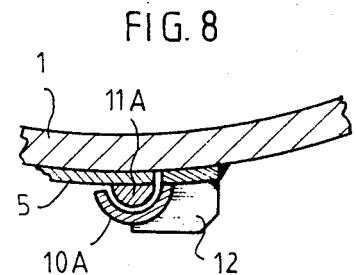

In the embodiment shown in FIGS. 6 to 8, the means for fixing fender 2 to pylon 1 comprise half tubes 10A,10B welded to the pylon 1 and half round bars 11A,11B welded to the lateral edges of frame 5, which are inserted in the half tubes 10A,10B for locking the fender in position on pylon 1; the half tubes 10A,10B are advantageously reinforced with stiffeners 12.

Figure 9:
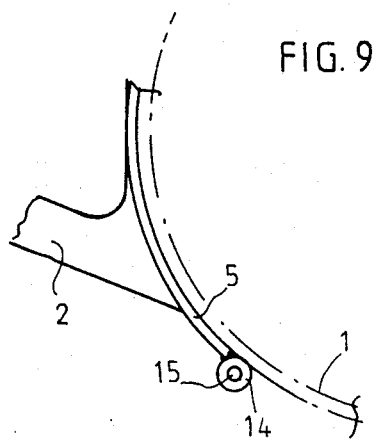
FIGS. 9 to 11 are views similar to FIGS. 3 to 5 of another embodiment of the fixing means.
Figure 10:
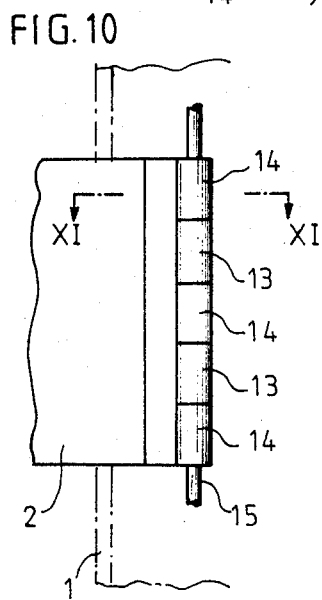
Figure 11:
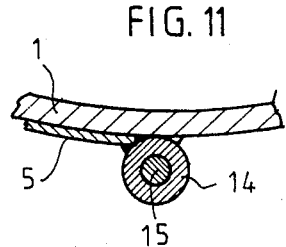

In the embodiment shown in FIGS. 9 to 11, the means for fixing fender 2 to pylon 1 comprise tubes 13 welded to pylon 1 and tubes 14 welded to the lateral edges of frame 5, which interfit in an aligned manner with each other during fitting of frame 5 carrying fender 2 on pylon 1, in the manner of hinges and are locked in position by a shaft 15.

Figure 12:
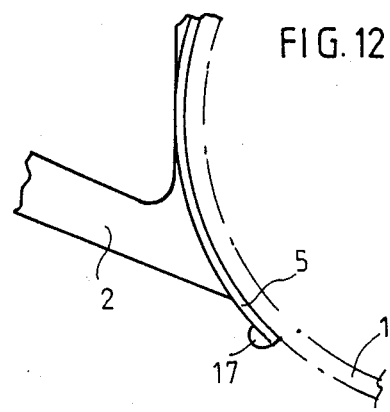
FIGS. 12 to 14 are views similar to FIGS. 3 to 5, of another embodiment of the fixing means.
Figure 13:
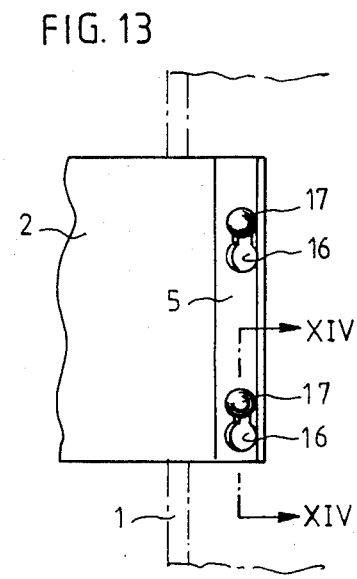
Figure 14:
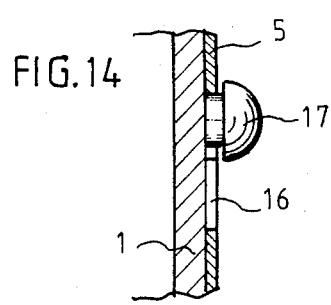

In the embodiment shown in FIGS. 12 to 14, the fixing means comprise button-holes 16 formed in the lateral opposite edges of frame 5, in which are inserted headed rivets 17 integral with the pylon 10, these fixing means providing relatively vertical movement of fender 2 in the limits set by the button-holes 16.

Figure 15:
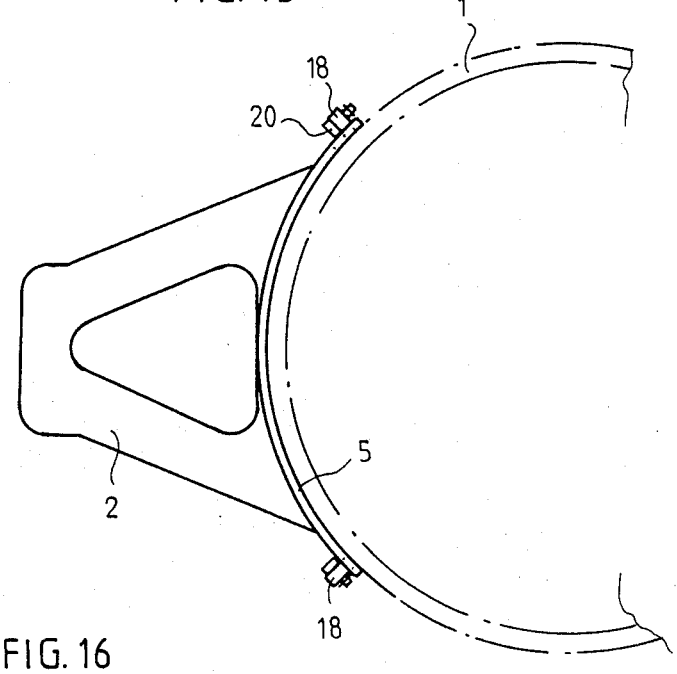
FIGS. 15 to 17 are views similar to FIGS. 3 to 5 of another embodiment of the fixing means.
Figure 16:
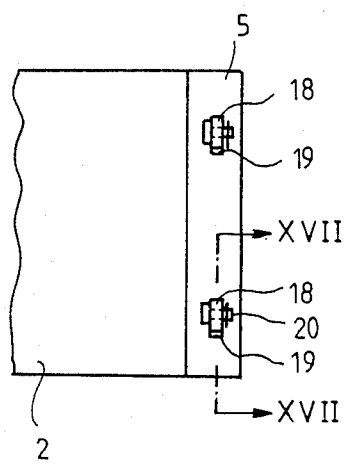
Figure 17:
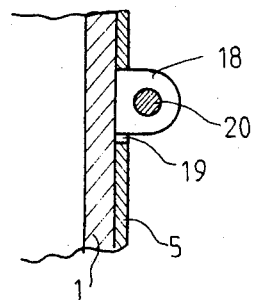

In the embodiment shown in FIGS. 15 to 17, the fixing means comprise lugs 18 welded to pylon 1 and orifices 19 of corresponding shape formed in the lateral edges of frame 5, in which said lugs 18 are inserted, interconnection of frame 5 with pylon 1 being provided by rivets, pins or shafts 20 inserted in the orifices 19 in line with lugs 18.

In another embodiment, not shown, the means for fixing fender 2 to pylon 1 comprise lugs welded to pylon 1, opposite orifices formed in the lateral edges of frame 5, interlocked together by means of rivets, pins or shafts.

The fixing means which have just been described above provide easy fitting of the fenders to the tubular structures to be protected and just as easy removal in the case where it is necessary to replace the fenders.

However, the fixing means which have just been described only form non limitative examples; other equivalent fixing means being able to be envisaged within the scope of the present invention. It may also be envisaged to fix the fender carrying structure to the tubular structure to be protected by welding, in the case where removal and replacement of the fenders are not considered necessary.

Although the fender shown in the drawings is a fender with a substantially Δ shaped profile, it will be readily understood that use of fenders having any other appropriate profile comes within the scope of the invention and more especially the use of D or M shaped fenders, as mentioned above or the use of fenders with an inverted V profile or with a semi-cylindrical profile, to the extent that those fenders are fixed, in accordance with the present invention, to curved frames exactly matching the shape of the structure to be protected.

The arrangement of fenders fixed to curved frames narrowly matching the shape of the structure to be protected said frames providing reliable fixing without plates or bolts to pylons or similar, considerably reduces the surface of the pylons or similar directly exposed to the shocks of the waves, with respect to plate and bolt fixing methods, the vertical surface exposed being about four times less in the case of the arrangement of the invention.

Although the invention has been described in the foregoing with respect to protecting offshore drilling platform pylons, it will be readily understood that it is applicable to the protection of all fixed or floating support structures such as pylons, risers, docks, platforms, drilling barges, port installations, piles driven into the sea for coming alongside, pillars for bridges, electric pylons, telepheric pylons, etc . . . and more especially to the protection of all structures sensitive to shocks or collisions, or placed in liquid environments presenting appreciable variations of level and/or exposing said structures to considerable stresses, it being noted that it is more particularly suitable for protecting cylindrical or circular structures.

Although the invention has been described specifically in relation with installation fenders of the type which has just been mentioned, it goes without saying that it is not limited to such applications and that it extends to the protection of all fixed or floating installations sensitive to shocks and/or to the corrosive environment in which they operate.

As follows from what has gone before, the invention is in no way limited to those of its embodiments and modes of application which have just been described more explicity; it embraces on the contrary all variations thereof which may occur to a technician skilled in the matter, without departing from the scope or spirit of the present invention.

What is claimed is:

1. An alongside fender for protecting a curved support structure against shocks applied thereto, comprising:
    a frame which is curved and has a conforming radius substantially equal to the radius of said curved support structure;
    a shock absorbing rubber member firmly secured to said frame; and
    detachable fixing means positioned on opposite sides of said frame for securing said frame to said support structure, said fixing means comprising:
    a first and second member which are fixed to said support structure and to said frame, respectively, and
    interconnecting means allowing these members to cooperate as a fixing means, namely locking said frame in position on said support structure.

2. A fender as claimed in claim 1, wherein said first and second members comprise first and second aligned tubes, of which the first tubes are connected to the support structure whereas the second tubes are connected to the frame, and wherein said interconnecting means consist of a locking shaft member positioned in said first and second tubes.

3. Fender as claimed in claim 1, wherein said first member comprises a tube portion fixed to the support structure and said second member comprises a half round bar fixed to the frame, and wherein said interconnecting means are constituted by the same half round bar which is positioned within said tube portion for locking said frame in position on said structure.

4. Fender as claimed in claim 1, wherein said first member comprises a plurality of vertical pierced lugs integrally connected with said support structure, and said second member comprises a plurality of orifices formed in said frame within which said lugs are respectively positioned, and wherein said interconnecting means comprise a plurality of horizontal pin members positioned in said pierced lugs and intended to lock said frame in position on said support structure.

5. Fender as claimed in claim 1, wherein said first and second members comprise first and second pierced lugs, whereas said first lug is fixed to said frame and said seocnd lug is fixed to said support structure, and wherein said interconnecting means consists of a locking shaft member positioned in said first and second pierced lugs.

6. Fender as claimed in claim 1, wherein said first member comprises a plurality of rivets fixed to said support structure and said second member comprises a plurality of button-holes provided on edges of a base portion of said frame for cooperative engagement with said button-holes, and wherein said interconnecting means consists of heads members with which each one of said rivets is provided and which are intended to lock said frame in position on said support structure.

7. An alongside fender for protecting a curved support structure against shocks applied thereto, comprising:
- a frame which is curved and has a confirming radius substantially equal to the radius of said curved support structure;
- a shock absorbing rubber member firmly secured to said frame; and
- detachable fixing means positioned on opposite sides of said frame for securing said frame to said support structure, said fixing means comprising a first and a second member fixed to said support structure and to said frame, respectively, wherein said first member comprises a tube portion fixed to the support structure and said second member comprises a half round bar fixed to the frame, said half round bar being positioned within said tube portion for locking said frame in position on said structure.

* * * * *